April 28, 1925.
S. H. HOBSON
GEAR PUMP
Filed Aug. 8, 1921
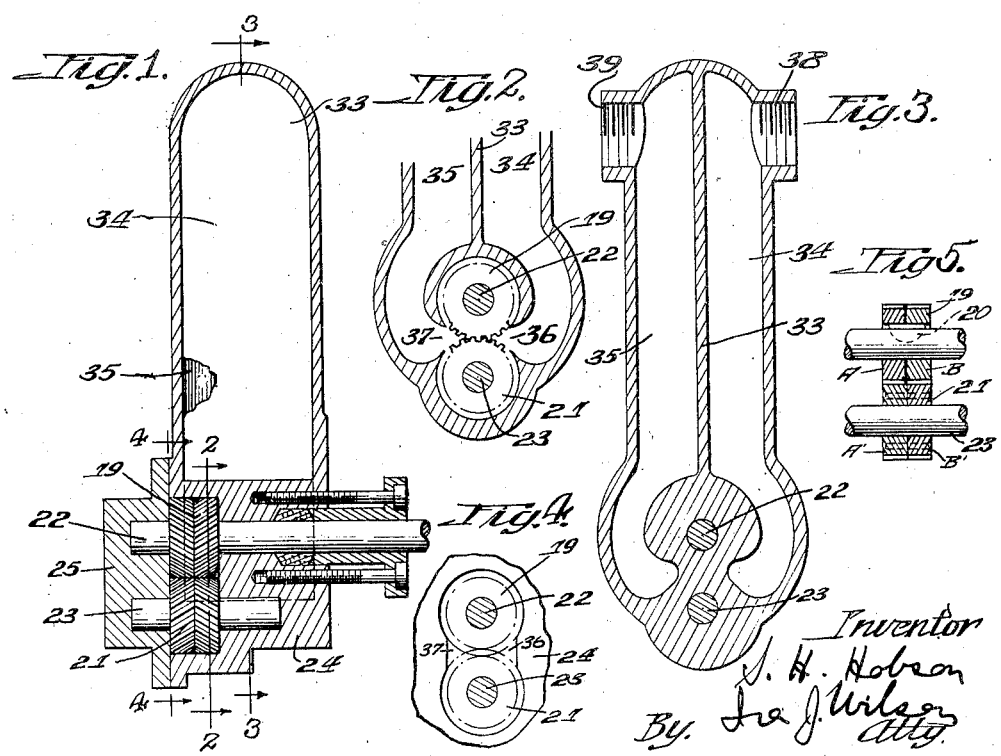

Patented Apr. 28, 1925.

1,535,310

UNITED STATES PATENT OFFICE.

STANLEY H. HOBSON, OF ROCKFORD, ILLINOIS, ASSIGNOR TO GEO. D. ROPER CORPORATION, OF ROCKFORD, ILLINOIS, A CORPORATION OF ILLINOIS.

GEAR PUMP.

Application filed August 8, 1921. Serial No. 490,757.

*To all whom it may concern:*

Be it known that I, STANLEY H. HOBSON, a citizen of the United States, residing at Rockford, in the county of Winnebago and State of Illinois, have invented certain new and useful Improvements in a Gear Pump, of which the following is a specification.

The primary purpose of this invention is to improve the construction of gear pumps of the type employing herringbone gears. To this end I have made each gear of two parts and so mounted them on their respective shafts as to insure accurate meshing of the gears regardless of dimensional variances, to reduce friction and wear to a minimum, and to prevent leakage of the fluid between the gear parts.

Another purpose is to provide a gear pump of the character specified having a housing of novel construction, including a head having an upright intake and a discharge conduit, providing a vertical column of water or other liquid which serves as a permanent seal and prime for the gears.

My invention also contemplates the provision of a herringbone gear pump having a two part driving gear, which parts have a limited rotary play on their supporting shaft for the purpose of compensating for any irregularities in the companion gear, thus eliminating undue friction and wear and greatly increasing the life of the gears.

Other objects and attendant advantages will be appreciated by those familiar with this art as the invention becomes better understood by reference to the following description when considered in connection with the accompanying drawings, in which—

Figure 1, is a vertical section through a gear pump embodying my invention;

Figs. 2, 3 and 4, are sections taken on the lines 2—2, 3—3 and 4—4 respectively of Fig. 1; and Fig. 5, is a longitudinal section through the herring bone gears.

Referring more particularly to the drawings, it will be observed that the intermeshing herringbone gears 19 and 21 are fixed as to rotation to shafts 22 and 23 respectively, suitably journaled in a pump housing or casing 24 and a bearing cap 25. Each gear is preferably formed of two parts, the gear 19 comprising the parts A and B, and the gear 21, parts A' and B'. The latter parts are rigidly fastened together and suitably keyed or fixed to the shaft 23. The parts A and B are unconnected one with the other, and are fastened by a woodruff key 20 to the shaft 22, the key fit in the gear parts being a trifle loose allowing each gear part a limited rotative movement on the shaft 22. This permits perfect meshing of each gear part with its companion integral gear part. Furthermore, the loose driving gears by the action of their inclined teeth against those on the respective companion gears are urged together; and the driven gear parts being integrally united are not permitted to separate. This insures a tight joint between the loose or floating gear parts and prevents leakage between them. The loose connection of the driving shaft in its gear parts also prevents any binding or distortion in the event of any disalignment of these parts as the result of variances in the manufacture thereof. It follows that undue friction, binding and wear of the gears is eliminated, and that the life of the gears is greatly increased. The pump housing 24 has cast integral therewith an upstanding head 32 divided longitudinally by a wall 33, into a suction conduit 34 and a discharge conduit 35. These conduits 34 and 35 terminate at their lower ends in suction and discharge ports 36 and 37 respectively, communicating with the intermeshing region of the gears, as plainly shown in Fig. 6. It will be observed viewing Fig. 1, that one side of the gears is flush with the adjoining face of the housing 24, and that as shown in Fig. 4, the suction and discharge ports 36 and 37 reach to these outer sides, and consequently from end to end of the gear faces. The upper end of the head 32 is shaped to provide threaded connections 38 and 39 for the suction and discharge ends of the pipe line. These connections, it will be noted are substantially spaced above the gears so that the latter are always submerged in a column of water filling the conduits 34 and 35. In other words, these conduits form a very practical seal and primer for the gears.

A herringbone gear pump such as I have disclosed herein may be driven at a comparatively high speed and will be practically noiseless. It has a comparatively large water delivery capacity, and the delivery is non-pulsating. Such delivery is especially desirable as the action is easier on the pressure regulator.

It is believed that the foregoing conveys a clear understanding of the objects prefaced above, and while I have illustrated and described but a single working embodiment of my invention, it should be understood that considerable change might be made in the construction and arrangement without departing from the spirit and scope of the invention as expressed in the appended claims:

I claim:

1. In a pump of the character described, the combination of a casing having inlet and outlet openings, intermeshing herring-bone gears rotatable in the casing between said openings, each gear being formed of two parts, a supporting shaft for each gear, one of which shafts is adapted for driving, the gear parts on the driving shaft being loosely keyed thereto and the gear parts on the other shaft being fixedly connected together.

2. In a pump of the character described, the combination of a casing having an inlet and an outlet opening, intermeshing herring-bone gears in the casing between said openings, each gear being formed of two parts, a driving shaft supporting one pair of gear parts, a supporting shaft for the driven pair of gear parts, a rigid connection between the driven gear parts and their supporting shaft, and a driving connection between the driving shaft and its gear parts permitting limited play of one of said gear parts on said driving shaft.

3. A pump of the character described comprising a casing, and a pair of intermeshing gears journaled in the casing, the casing having cast integrally therewith an upstanding head divided longitudinally from end to end thereof by a vertical wall into a suction and a discharge conduit, each terminating at its lower end in a port communicating with the intermeshing region of the gears and at its upper end in an opening for a pipe connection.

STANLEY H. HOBSON.